US012657276B1

(12) United States Patent
　　Chowansky

(10) Patent No.:　US 12,657,276 B1
(45) Date of Patent:　Jun. 16, 2026

(54) AURA IDENTIFICATION BIOMETRIC AUTHENTICATION SYSTEM

(71) Applicant: Nolan Francis Chowansky, Bluffton, SC (US)

(72) Inventor: Nolan Francis Chowansky, Bluffton, SC (US)

(73) Assignee: Nolan Francis Chowansky, Tampa, FL (US)

( * ) Notice: Subject to any disclaimer, the term of this patent is extended or adjusted under 35 U.S.C. 154(b) by 0 days.

(21) Appl. No.: 19/192,379

(22) Filed: Apr. 29, 2025

(51) Int. Cl.
　　*G06F 21/00*　　(2013.01)
　　*G06F 21/32*　　(2013.01)
　　*G06F 21/45*　　(2013.01)

(52) U.S. Cl.
　　CPC .............. *G06F 21/32* (2013.01); *G06F 21/45* (2013.01); *G06F 2221/2137* (2013.01)

(58) Field of Classification Search
　　CPC ... G06F 21/32; G06F 21/45; G06F 2221/2137
　　See application file for complete search history.

(56) References Cited

U.S. PATENT DOCUMENTS

| | | | | |
|---|---|---|---|---|
| 2014/0165184 A1* | 6/2014 | Lange | .................... | G06F 21/32 726/19 |
| 2018/0296777 A1* | 10/2018 | Terry | ................... | A61M 11/041 |
| 2020/0342086 A1* | 10/2020 | Oung | .................. | H04W 12/065 |
| 2024/0265080 A1* | 8/2024 | Lee | ......................... | G06F 21/32 |

* cited by examiner

*Primary Examiner* — William A Corum, Jr.

(57)　　　　　ABSTRACT

An Aura Identification biometric authentication system and method provide secure, multi-modal user verification by fusing dynamic chemical signatures (e.g., sweat composition and pheromones) with bioelectric signatures, including electroencephalogram (EEG), electrocardiogram (ECG), and electromyogram (EMG) signals. Utilizing graphene-coated nanostructured sensors and silicon photonic interconnects, the system delivers high-accuracy, low-latency authentication through machine learning-driven data fusion. A machine learning-driven weighted scoring model combines the chemical, bioelectric, and photonic data streams for robust identity verification, while a time-limited activation mechanism requires periodic re-authentication to maintain security. The system can be adapted for use with personal electronic devices, secure facility access, public transportation, Internet of Things (IoT) systems, as well as applications in government, law enforcement, and military sectors. By leveraging dynamic biomarkers and advanced processing, the invention offers superior protection against unauthorized access and environmental variability compared to traditional biometric systems.

25 Claims, 7 Drawing Sheets

100

Top Down View

300

Personal Wearable Electronic Device

Power/Battery

Power/Battery

Bioelectric Signal Sensor

Power Wire

Chemical Signal Induction Fan

Optical Waveguides (Photonics)

Bioelectric Signal Sensor

Induction Tube

Chemical Signature Sensor Chip

Biometric Authentication Motherboard

Biometric Identity Authentication Chip

400

700

AURA IDENTIFICATION BIOMETRIC AUTHENTICATION SYSTEM

BACKGROUND OF THE INVENTION

Field of the Invention

The present invention relates generally to the field of aura identification biometric authentication systems and, more particularly, to a multi-modal biometric security system that integrates dynamic chemical signatures, such as those derived from sweat composition and pheromones, and bioelectric signatures, including electroencephalogram (EEG), electrocardiogram (ECG), and electromyogram (EMG) signals. The system employs advanced sensor technologies, including graphene-coated nanostructured arrays and silicon photonic interconnects, coupled with machine learning algorithms to achieve high-accuracy, low-latency authentication. It further incorporates a time-limited activation mechanism to enhance security. The invention is applicable to a wide range of domains, including personal electronic devices, secure facility access, public transportation, Internet of Things (IoT) systems, and government, law enforcement, and military identification.

Description of Related Art

Biometric authentication systems have been developed to enhance security by leveraging unique physiological and behavioral characteristics of individuals, such as fingerprints, iris patterns, and facial features. For instance, U.S. Pat. No. 5,719,950 discloses a system combining specific biometric parameters (e.g., fingerprints) with non-specific physiological characteristics (e.g., blood oxygen levels) to authenticate individuals and verify their physical condition, using sensors like silicon photodiodes. Similarly, U.S. Pat. No. 6,898,299 describes authentication based on internal electric or magnetic characteristics, sensed via a card reader, while U.S. Pat. No. 7,773,779 outlines a global biometric identification system for traditional biometrics like face and iris scans. Other patents, such as U.S. Pat. No. 10,970,375, utilize machine learning to generate biometric signatures from acoustic signals, and U.S. Pat. No. 8,337,926 employs dynamic code conversion for biometric authentication. Additionally, WO 90/08366 and EP 2,048,592 address multi-modal biometric identification and large-scale signature comparison, respectively, while U.S. Pat. No. 7,438,225 uses periodic sampling of static biometrics for continuous verification. These systems, however, primarily rely on static or single-modal biometrics, are susceptible to environmental factors, and lack advanced processing techniques to handle dynamic biomarkers, limiting their adaptability and security.

In contrast, the present invention provides a novel biometric authentication system that integrates dynamic chemical signatures (e.g., sweat composition, pheromones) and bioelectric signatures (e.g., EEG, ECG, EMG), processed through a unique combination of graphene-coated nanostructured sensors, silicon photonics, and machine learning. Unlike prior art, which focuses on traditional or single-modal biometrics, the proposed system employs a dual-mode authentication framework with user-configurable options, enabling flexible operation across diverse applications, from personal devices to secure facilities. The incorporation of silicon photonics ensures high-speed, low-latency data transmission, while a weighted scoring model fuses multi-modal data for enhanced accuracy. Furthermore, a time-limited activation mechanism minimizes unauthorized access risks, addressing vulnerabilities in systems like those in U.S. Pat. No. 7,438,225, which lack such temporal controls. By overcoming limitations such as environmental sensitivity, spoofing risks, and processing inefficiencies found in prior art, the present invention offers a non-obvious, robust solution that significantly advances the field of biometric security.

SUMMARY OF THE INVENTION

The present invention provides aura identification biometric authentication system and method that integrates dynamic chemical signatures, such as those derived from sweat composition and pheromones, with bioelectric signatures, including electroencephalogram (EEG), electrocardiogram (ECG), and electromyogram (EMG) signals, to deliver secure, multi-modal user verification. Unlike traditional biometric systems reliant on static modalities like fingerprints or iris scans, the invention leverages continuously refreshed biomarkers to enhance security and adaptability. The system is designed for applications across personal electronic devices, secure facility access, public transportation, Internet of Things (IoT) systems, and government, law enforcement, and military identification, offering robust protection against unauthorized access and environmental variability.

In various embodiments, the system employs advanced sensor technologies, including graphene-coated nanostructured arrays for chemical signature detection and nanoscale capacitive sensors for bioelectric signal capture. Silicon photonic interconnects enable high-speed, low-latency data transmission at rates up to 1.0 Tbps, minimizing electromagnetic interference. A machine learning-driven fusion algorithm processes chemical, bioelectric, and photonic data, utilizing a weighted scoring model (e.g., 0.3 for chemical, 0.4 for bioelectric, 0.3 for photonic) to achieve authentication accuracy exceeding 92%. A time-limited activation mechanism restricts device or system access to a predetermined interval, requiring periodic re-authentication to mitigate risks of unauthorized use, such as in cases of device theft or loss.

Certain embodiments offer user-configurable authentication modes, allowing selection between chemical signature authentication, bioelectric signature authentication, or a dual-mode approach combining both. For chemical authentication, sensors detect user-specific biomarkers (e.g., lactic acid, urea, amino acids) in sweat vapor, collected via a MEMS-based micro fan (2.0×2.0 mm) with a detection limit of one part per billion. For bioelectric authentication, sensors capture low-frequency physiological signals (0.05-500 Hz), processed through adaptive bandpass filters and neural network algorithms to generate a unified biometric profile. The system's feedback loop dynamically adjusts sensor sensitivity based on ambient conditions (e.g., temperature, humidity), ensuring consistent performance across diverse environments.

The invention further provides a method for authenticating a user, comprising receiving one or more biological samples, analyzing the samples to extract chemical and/or bioelectric signatures, and authenticating the user by comparing extracted signatures to stored profiles. Upon successful authentication, access is granted to a computing device, facility, or system, with re-authentication prompted after a predetermined period (e.g., 30 minutes). The method leverages silicon photonics to detect refractive index changes for volatile organic compounds (VOCs) and convert bioelectric signals to light for transmission, enhancing processing efficiency.

Additionally, an apparatus and computer system are provided, comprising one or more processors and computer-readable storage media storing instructions to execute the authentication process. The apparatus includes compact sensor chips (e.g., 5.0×5.0 mm) integrated into devices via water-resistant ports, ensuring seamless embedding in smartphones, wearables, or security platforms. The system supports alternative biometric modalities (e.g., saliva, galvanic skin response) and configurations (e.g., cloud-based, edge computing), broadening its adaptability. By combining dynamic biomarkers, advanced sensor technologies, and robust security features, the invention significantly advances the field of biometric authentication.

DETAILED DESCRIPTION OF THE INVENTION

Figure 1:
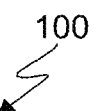
FIG. 1 is a functional block diagram illustrating a computing environment, in accordance with various embodiments of the systems and methods disclosed herein
Figure 1:
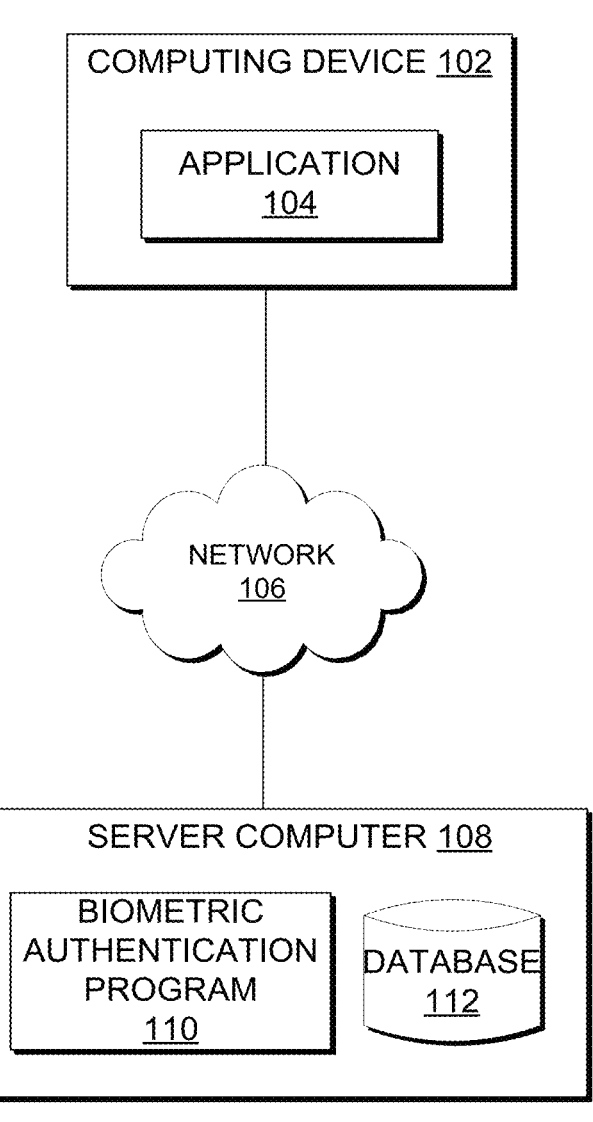

The present disclosure provides systems and methods for a multi-modal biometric authentication system that addresses limitations of traditional biometric technologies, offering enhanced security, reliability, and adaptability across diverse environments and applications.

Traditional biometric systems, such as those based on facial recognition, fingerprint scanning, iris scanning, voice recognition, or other modalities, are susceptible to environmental and situational factors that degrade performance. For example, facial recognition may fail under varying lighting conditions, fingerprint scanners may be ineffective with dirty or wet fingers, and voice recognition may struggle with background noise. These factors can result in false rejections or acceptances, reducing system reliability and user confidence. The present invention overcomes these challenges by integrating multiple biometric modalities to create a robust, adaptive authentication platform.

Embodiments of the disclosed systems and methods provide a multi-modal biometric authentication system that verifies user identity based on one or more biometric signatures, including but not limited to chemical signatures, bioelectric signatures, or combinations thereof. A "chemical signature" refers to a unique combination of chemical compounds or molecular markers (e.g., biomarkers such as amino acids, electrolytes, metabolites, pheromones, or volatile organic compounds) present in biological samples, including but not limited to sweat, saliva, blood, urine, breath, tears, skin cells, or other bodily secretions. These biomarkers, which vary dynamically with physiological state, provide a difficult-to-replicate security measure. A "bioelectric signature" refers to patterns derived from physiological signals, including but not limited to heart rhythms, brainwave patterns, muscle activity, nerve signals, or other bioelectric or electromagnetic properties, forming a unique physiological profile intrinsically linked to an individual's state. This dual-mode approach, optionally combined with other modalities (e.g., optical or photonic signatures), creates a multi-dimensional biometric profile that enhances security and reduces susceptibility to environmental factors.

The system integrates chemical, bioelectric, and/or additional biometric signals into a unified authentication platform, generating a composite biometric signature unique to each user. A temporal authentication mechanism restricts access to a configurable time window following a successful authentication event, minimizing vulnerabilities if a device is lost or stolen. The system may be implemented in various devices, including but not limited to mobile devices, wearables, embedded systems, Internet of Things (IoT) devices, edge computing platforms, or fixed installations (e.g., access control systems), and supports applications in sectors such as secure facilities, transportation, healthcare, finance, government, law enforcement, military, or consumer electronics. These technical solutions improve biometric security by leveraging temporal and multi-modal authentication mechanisms, enhancing accuracy, reducing false acceptance and rejection rates, and ensuring reliable performance across diverse environmental conditions (e.g., varying temperature, humidity, or electromagnetic interference). The system's adaptability to dynamic biomarkers and integration with advanced technologies (e.g., machine learning, optical/photonic systems, secure storage) distinguishes it from conventional biometrics.

FIG. 1 is a functional block diagram illustrating an example computing environment, generally designated computing (100), for implementing the biometric authentication system in accordance with various embodiments of the present disclosure. FIG. 1 represents one possible implementation and does not limit the environment in which embodiments may be deployed, which may include but are not limited to standalone systems, mobile devices, wearable devices, Internet of Things (IoT) networks, edge computing platforms, or cloud-based architectures.

Computing environment (100), as illustrated in FIG. 1, includes computing device (102) hosting application (104), server computer (108), and network (106) interconnecting these components. Computing device (102) and server computer (108) may be any electronic device or system capable of receiving, sending, and processing data, including but not limited to standalone computers, mobile devices (e.g., smartphones, tablets), wearable devices (e.g., smartwatches), embedded systems, Internet of Things (IoT) devices, edge computing platforms, management servers, webservers, or desktop systems. In some embodiments, computing device (102) and server computer (108) may form a server computing system utilizing multiple computers, such as in a cloud computing environment, as depicted and described in further detail with respect to FIG. 5. In other embodiments, they may be integrated into a single device or comprise clustered systems (e.g., database servers, application servers) acting as a seamless resource pool within a computing environment (100). These devices include internal and external hardware components, such as processors, memory, and sensor interfaces, capable of executing machine-readable instructions for biometric authentication.

Computing device (102), as depicted in FIG. 1, is a user-operated electronic device hosting application (104). Computing devices (102) may include, but is not limited to, mobile devices (e.g., smartphones, tablets), wearable devices (e.g., smartwatches, fitness trackers), embedded systems, Internet of Things (IoT) devices, access control systems, or other platforms capable of processing biometric data. Application (104) communicates with server computer (108) over network (106) to access biometric authentication program (110) and database (112), using communication protocols such as TCP/IP, HTTP, MQTT, or other standards. Application (104) facilitates user authentication based on one or more biometric signatures, including but not limited to chemical, bioelectric, optical, or behavioral signatures, as described in greater detail below. Application (104) may be implemented as a browser-based interface, web portal, mobile application, dedicated software, firmware, or any interface capable of interacting with biometric authentication program (110), enabling transmission of instructions for user authentication.

Network (106), as depicted in FIG. 1, encompasses one or more communication networks facilitating data exchange among computing device (102), server computer (108), and additional devices within computing environment (100). Network (106) may include, but is not limited to, telecommunications networks, local area networks (LANs), wide area networks (WANs) (e.g., the Internet), mobile networks (e.g., 5G, NextG), mesh networks, edge networks, or combinations thereof, utilizing wired, wireless, satellite, fiber optic, or other connection technologies. Network (106) supports transmission of data signals, including biometric data, authentication requests, and control messages, enabling seamless communication across the system. The network employs various protocols and architectures to ensure reliable connectivity, as required by the biometric authentication system described herein.

Server computer (108) is a digital device that hosts biometric authentication program (110) and database (112). In this embodiment, biometric authentication program (110) and database (112) reside on server computer (108). In other embodiments, biometric authentication program (110) and/or database (112) can be stored locally on computing device (102). Other embodiments include biometric authentication program (110) and/or database (112) being local to or virtually part of another computing device (e.g., a wearable computing device). In yet other embodiments, an instance of biometric authentication program (110) and/or database (112) can be stored on computing device (102) and can communicate with another instance of biometric authentication program (110) residing on server computer (108). In some embodiments, biometric authentication program (110) can be a stand-alone program on a computing device. In certain aspects of the systems and methods disclosed herein, biometric authentication program (110) and database (112) can be cloud based, utilizing multiple computing devices, made available as a software as a service (SaaS), as part of an infrastructure as a service (IaaS) system, as part of a platform as a service (PaaS), etc.

Biometric authentication program (110), as depicted in FIG. 1, provides a multi-modal biometric system that authenticates users based on one or more biometric signatures, including but not limited to chemical, bioelectric, optical, or behavioral signatures, with temporal authentication mechanisms to enhance security. When implemented, the system enables secure access to facilities, transportation systems (e.g., planes, trains, buses, rideshares), healthcare platforms, financial systems, government identification, law enforcement, military applications (e.g., buildings, devices, storage areas), enterprise systems, or consumer devices, and may integrate with existing infrastructures, such as IoT networks, biometric security systems, or smart city frameworks. The system collects biometric data, including biological samples (e.g., sweat, saliva, breath) and/or physiological signals (e.g., heart rhythms, brainwaves), following user consent obtained through interfaces providing opt-in/opt-out options and data deletion capabilities. User privacy is ensured by encrypting biometric data using industry-standard methods, including but not limited to AES-256, RSA, or quantum-resistant algorithms, during transmission and storage.

Biometric authentication program (110), as depicted in FIG. 1, processes biometric data, including biological samples and/or physiological signals, to generate user-specific biometric signatures for authentication. For chemical authentication, the program collects biological samples, such as sweat, saliva, breath, or other bodily secretions, to identify biomarkers (e.g., amino acids, electrolytes, volatile organic compounds). For bioelectric authentication, the program captures physiological signals, including but not limited to heart rhythms, brainwave patterns, muscle activity, or nerve signals, via methods such as electrocardiography, electroencephalography, electromyography, or other signal measurements, integrating these signals to form a unique physiological profile. The program applies signal processing techniques, including but not limited to filtering, normalization, and feature extraction, to isolate relevant biometric features. Analytical methods, such as machine learning, statistical models, or pattern recognition, identify user-specific biometric markers, which are processed into encrypted biometric templates stored in database (112) as part of a user's profile. The program operates on processing units, such as CPUs, GPUs, or embedded processors, with sufficient computational resources (e.g., supporting real-time sensor data streams), running operating systems compatible with biometric applications, as described in greater detail below.

Biometric authentication program (110), as depicted in FIG. 1, performs chemical signature authentication by analyzing biological samples to detect user-specific patterns of chemical compounds. The program collects samples, including but not limited to sweat, saliva, breath, blood, or other bodily secretions, and conducts chemical analysis to identify biomarkers, such as amino acids, electrolytes, metabolites, volatile organic compounds, proteins, or hormones, forming a unique chemical profile for each user. The program employs chemical sensors, including but not limited to electrochemical, optical, microfluidic, or nanostructured sensors, to detect and quantify biomarkers. Analytical methods, such as machine learning, statistical analysis, or pattern recognition, are applied to recognize patterns in the chemical signature, accounting for variations due to factors like diet, environment, hydration, or physiological state, as described in greater detail below.

For example, when biometric authentication program (110), as depicted in FIG. 1, is configured to perform chemical signature authentication, it isolates biomarkers, such as volatile organic compounds, amino acids, electrolytes, or metabolites, from environmental noise using chemical sensors, including but not limited to nanostructured, electrochemical, or optical arrays. The program applies signal processing techniques, such as time-frequency analysis, spatial filtering, or noise cancellation, to mitigate ambient interference (e.g., $CO_2$, humidity, temperature) and employs analytical methods, such as machine learning, statistical models, or pattern recognition, trained on diverse biomarker profiles, to classify user-specific chemical patterns, thereby enhancing signal-to-noise ratio and authentication accuracy, as described in greater detail below.

Biometric authentication program (110), as depicted in FIG. 1, may integrate chemical signature authentication into compact sensor modules, such as chemical sensor chips, embedded in electronic devices, including but not limited to smartphones, wearables, access control systems, IoT devices, or medical diagnostic platforms. These modules employ chemical sensors, including but not limited to nanostructured, electrochemical, or optical arrays, optionally coated with materials like graphene, polymers, or metal oxides, to detect biomarkers, such as volatile organic compounds, sweat metabolites (e.g., lactic acid, urea), or other chemical compounds. The sensors are integrated via interfaces, such as water-resistant ports of varying dimensions (e.g., 0.5-5 mm), designed for efficient sample collection (e.g., airflow or diffusion). Calibrated using analytical methods, such as machine learning, statistical models, or pattern recognition, the sensors achieve enhanced sensitivity and specificity compared to conventional chemical sensors, operating at low power (e.g., <10 mW) to maintain device efficiency, form factor, and battery life, as described in greater detail below.

For example, biometric authentication program (110), as depicted in FIG. 1, may facilitate biometric sample collection using compact sample collection mechanisms, such as MEMS-based micro fans or microfluidic systems, integrated with chemical sensor modules. These mechanisms direct biological samples, such as sweat, saliva, or breath, to sensor arrays with high-efficiency surfaces, optionally enhanced with materials like graphene, polymers, or metal oxides, to capture biomarkers, including volatile organic compounds, metabolites (e.g., lactic acid, urea), or other chemical compounds. The collection process, utilizing sample volumes (e.g., 0.1-1 microliter) and optimized flow rates (e.g., 0.5-2 m/s), enables non-invasive, real-time analysis with high sensitivity (e.g., parts per billion or better). Compact design ensures compatibility with electronic devices, including but not limited to consumer devices, IoT systems, or access control platforms. No biometric samples are stored, and sensors reset via methods like thermal pulses or chemical cleaning post-analysis to ensure privacy.

Biometric authentication program (110), as depicted in FIG. 1, may generate a distinct biometric profile by capturing user-specific patterns of biomarkers, such as volatile organic compounds, metabolites (e.g., lactic acid, urea), amino acids, or other chemical compounds, using compact sensor modules. These modules, integrated into electronic devices, including but not limited to smartphones, wearables, IoT systems, access control platforms, or medical devices, employ chemical sensors, such as nanostructured, electrochemical, or optical arrays, to detect physical, chemical, or biological properties of biological samples (e.g., sweat, saliva, breath). Sample collection mechanisms, such as micro-electromechanical systems (MEMS) fans, microfluidic channels, or diffusion systems, of varying dimensions (e.g., 1-5 mm), direct samples to the sensor array in low-power settings (e.g., <10 mW). Analytical methods, including but not limited to machine learning, statistical analysis, or pattern recognition, process sensor data to create a digital chemical signature, which is matched against an encrypted template in a stored user profile in database (112) for authentication.

Biometric authentication program (110), as depicted in FIG. 1, compares biometric data, such as collected biological samples or physiological signals, with stored user profiles in database (112). The program matches the biometric data to corresponding profiles, authenticating the user upon a successful match. Authentication may be based on a configurable similarity threshold (e.g., 80-95%), allowing user-defined or system-optimized scores to indicate a match. The program logs authentication results, such as match scores or analysis metadata, in database (112) for purposes like auditing, performance optimization, or model retraining, adhering to privacy measures. For bioelectric authentication, the program identifies user-specific patterns in physiological signals, including but not limited to muscle activity, brainwave patterns, nerve signals, or other bioelectric properties, forming a unique physiological profile for identity verification.

Biometric authentication program (110), as depicted in FIG. 1, acquires bioelectrical signatures using sensor modules integrated into devices, such as wearable devices, smartphones, or access control systems. These modules employ sensors, including but not limited to capacitive, resistive, or optical sensors, to capture physiological signals, such as brainwave patterns, heart rhythms, muscle activity, nerve signals, or other bioelectric properties, across a frequency range (e.g., 0.05-500 Hz). The program generates a unified bioelectric signature by integrating signals from methods like electrocardiography, electroencephalography, electromyography, or other signal measurements, forming a unique physiological profile for each user. Sensor modules, comprising arrays of compact sensors, use analog front ends with noise reduction techniques, such as band-stop, adaptive, or band-pass filters, to isolate signals (e.g., EEG at 0.5-40 Hz, ECG at 0.5-40 Hz, EMG at 20-150 Hz) from environmental noise (e.g., 50/60 Hz power line interference). Signals are amplified, digitized, and processed in real time by processing units, such as microcontrollers or embedded processors, using analytical methods, including but not limited to neural networks, statistical models, or pattern recognition, to extract a digital biometric signature. Non-contact sensors may operate within varying distances (e.g., 0.5-10 cm), enabling detection through device surfaces (e.g., screens, casings). For example, a state-estimation filter, such as a Kalman filter, may reduce noise by predicting and updating signal states, ensuring accurate detection. The resulting signature is processed into an encrypted biometric template, stored in a tamper-proof environment in database (112), enabling secure authentication for unlocking devices, granting access, or continuous identity verification by matching real-time signatures to stored profiles.

Biometric authentication program (110), as depicted in FIG. 1, achieves enhanced accuracy compared to traditional biometric systems, such as fingerprint, iris, facial, or voice recognition, by leveraging multi-modal authentication. Systems utilizing program (110) exhibit reduced false acceptance and rejection rates and improved robustness to environmental and physiological variations (e.g., lighting, moisture, stress), ensuring reliable performance across diverse conditions. For example, a multi-modality configuration combining chemical, bioelectric, or other biometric signatures, using dynamic biomarkers such as volatile organic compounds from biological samples or physiological signals (e.g., EEG, ECG, EMG), provide superior accuracy and security compared to static biometrics, due to their time-varying nature and resistance to replication.

Biometric authentication program (110), as depicted in FIG. 1, may incorporate optical or photonic technologies, such as silicon photonics, into sensors or processing modules to enhance data processing and authentication. Silicon photonics utilizes silicon-based platforms to create photonic circuits that manipulate and transmit light, integrating optical components with microelectronics for high-bandwidth, low-latency data transfer. The program may authenticate users based, at least in part, on optical-based biometric signatures derived from biometric data (e.g., optical detection of biomarkers or physiological signals). For example, the system can detect changes in optical properties, such as refractive index or absorbance, caused by biomarkers (e.g., volatile organic compounds, electrolytes) in biological samples binding to sensor surfaces, including but not limited to nanostructured, graphene-coated, or polymer-coated arrays. Additionally, bioelectric signals may be converted to optical signals using components like photonic modulators for transmission via waveguides to processing units, enabling efficient, secure authentication.

For example, biometric authentication program (110), as depicted in FIG. 1, may integrate optical or photonic biosensors into compact sensor modules, such as chemical or bioelectric sensor chips, to detect biomarkers or process signals for authentication. Chemical sensor modules employ optical sensors, including but not limited to nanostructured, graphene-coated, or polymer-coated arrays, to measure changes in optical properties (e.g., refractive index, absorbance) caused by biomarkers, such as volatile organic compounds, metabolites (e.g., lactic acid, urea), or electrolytes, in biological samples (e.g., sweat, saliva, breath). Sample collection mechanisms, such as micro fans or microfluidic systems, direct samples to the sensor array, enabling non-invasive, label-free detection with high sensitivity (e.g., parts per billion or better). Optical waveguides, operating with various wavelengths (e.g., 1550 nm) and low propagation losses (e.g., <1 dB/cm), deliver light to the biosensor array, integrated via compact interfaces (e.g., 0.5-5 mm ports) designed for water resistance and efficient sample intake. Bioelectric sensor modules may convert physiological signals to optical signals using components like photonic modulators, transmitted via waveguides at high data rates (e.g., up to 1 Tbps) with low latency (e.g., <10 μs) to processing units, enhancing real-time authentication accuracy across electronic devices, including consumer devices, IoT systems, or access control platforms.

For bioelectric signal authentication, biometric authentication program (110), as depicted in FIG. 1, integrates sensor modules, such as bioelectric sensor chips, into electronic devices, including but not limited to wearable devices, access control systems, smartphones, or IoT platforms. These modules employ bioelectric sensors, including but not limited to graphene-based, capacitive, or optical arrays, for contactless capture of physiological signals, such as brainwave patterns, heart rhythms, muscle activity, or nerve signals, across varying detection ranges (e.g., 0.5-10 cm). The sensors are coupled with optical or photonic interconnects, such as silicon photonic systems, to transmit data to processing units. Photonic components, like modulators, convert bioelectric signals to optical signals for transmission via waveguides, operating in low-power settings (e.g., <10 mW) to support compact devices. Optical interconnects enable high-speed data transfer (e.g., up to 1 Tbps) with minimal latency (e.g., <10 μs) and mitigate electromagnetic interference, enhancing reliability across diverse environmental conditions (e.g., electrical noise, temperature variations).

Biometric authentication program (110), as depicted in FIG. 1, may integrate multi-modal biometric data using processing units with optical or photonic components, such as photodetectors, modulators, or amplifiers, to process signals from chemical and bioelectric sensor modules. The program employs a fusion algorithm, utilizing analytical methods like neural networks, statistical models, or pattern recognition, to combine data from multiple biometric signatures, including but not limited to chemical, bioelectric, or optical-based signatures. For example, a weighted scoring model assigns configurable weights to each modality's data, derived from biological samples or physiological signals, requiring the combined score to exceed a configurable threshold (e.g., 80-95%) for successful authentication. This process ensures secure user verification by matching real-time signatures against encrypted templates stored in database (112). Photonic systems, such as silicon photonics, process optical signals with high-speed data transfer (e.g., up to 1 Tbps) and low latency (e.g., <10 μs), enabling efficient data fusion and secure storage while enhancing real-time authentication accuracy with dynamic biomarkers.

By integrating optical or photonic technologies, such as silicon photonics, biometric authentication program (110), as depicted in FIG. 1, enables optical components, including but not limited to waveguides, fibers, or modulators, to be embedded within device structures, such as casings or interfaces, for enhanced data transmission rates and sensitivity. This integration supports low-power operation (e.g., <10 mW), compact design, and extended battery life across electronic devices, including but not limited to smartphones, wearables, IoT systems, or access control platforms. For example, photonic components, fabricated on various substrates like silicon or polymers, are integrated via interfaces (e.g., water-resistant ports or surface mounts) for chemical detection of biomarkers (e.g., volatile organic compounds, electrolytes) and bioelectric sensing of physiological signals (e.g., EEG, ECG), ensuring robust, seamless operation in diverse environmental conditions (e.g., humidity, temperature). Additional benefits, such as scalability, durability, or compatibility with multi-modal authentication, further enhance system performance.

Biometric authentication program (110), as depicted in FIG. 1, may integrate optical or photonic technologies into compact sensor interfaces, such as water-resistant ports or surface mounts, to facilitate high-sensitivity biomarker detection. These interfaces incorporate optical components, including but not limited to fibers, waveguides, or lenses, to deliver light for detecting biomarkers, such as volatile organic compounds, electrolytes, or proteins, in biological samples (e.g., sweat, saliva, breath). The compact design, with interfaces of varying dimensions (e.g., 0.5-5 mm), ensures compatibility with electronic devices, including but not limited to smartphones, wearables, IoT systems, or access control platforms, while maintaining water resistance and enabling reliable, user-friendly operation, as described in greater detail below.

Biometric authentication program (110), as depicted in FIG. 1, optimizes biometric sensors, such as those for chemical or bioelectric signatures, using a feedback loop that dynamically adjusts sensor parameters, such as sensitivity, gain, or filtering, based on environmental or physiological conditions (e.g., temperature, humidity, electrical noise, user physiological state). For example, the program calibrates sensors to account for variations in biometric data, such as changes in biomarker composition or signal characteristics, ensuring consistent performance across electronic devices, including but not limited to smartphones, wearables, IoT systems, or access control platforms.

Biometric authentication program (110), as depicted in FIG. 1, compares biometric data, including biological samples or physiological signals, with stored user profiles in database (112). The program matches the biometric data to corresponding profiles using configurable criteria, such as similarity thresholds, authenticating the user upon a successful match. This process supports secure authentication across electronic devices, including but not limited to smartphones, wearables, IoT systems, or access control platforms, as described herein.

Biometric authentication program (110), as depicted in FIG. 1, can be configured to authenticate users using one or more biometric signatures, including but not limited to chemical, bioelectric, optical-based, or other modalities, individually or in combination. Configurable through interfaces or system settings, the program supports flexible authentication modes across electronic devices, including but not limited to smartphones, wearables, IoT systems, or access control platforms, as described herein.

Database (112), as depicted in FIG. 1, serves as a secure repository for user profiles and associated biometric data. User profiles comprise biometric signatures, including but not limited to chemical, bioelectric, or optical-based signatures, and authentication-related data, such as logs of attempts, results, or metadata. The database may reside on various infrastructures, such as cloud, local, or hybrid systems, and store additional user-related information, such as preferences or identifiers. Compliant with data protection regulations, including but not limited to GDPR and HIPAA, database (112) implements security measures like role-based access controls and periodic audits. Users can opt-in or opt-out of data collection, with stored data securely deleted within configurable periods upon opting out, ensuring privacy across electronic devices, including but not limited to smartphones, wearables, IoT systems, or access control platforms.

Database (112), as depicted in FIG. 1, can be implemented using various non-volatile storage technologies, including but not limited to solid-state drives, hard disk drives, redundant arrays of independent disks (RAID), or cloud-based storage systems. The database may reside on server computers (108), other computing systems, or distributed across multiple authorized systems with secure access granted to biometric authentication program (110). This implementation supports scalable, reliable storage for biometric data across electronic devices, including but not limited to smartphones, wearables, IoT systems, or access control platforms.

Biometric authentication program (110), as depicted in FIG. 1, integrates analytical methods, such as machine learning or statistical models, for adaptive biometric data processing and optical or photonic technologies, such as photonic interconnects, for high-speed, low-latency processing, distinguishing the system from traditional biometric systems, including but not limited to fingerprint, iris, or voice recognition. The program may also authenticate users based on additional biometric signatures, such as DNA, gait, or behavioral patterns, enhancing versatility across electronic devices, including but not limited to smartphones, wearables, IoT systems, or access control platforms.

Certain embodiments of the present invention can be integrated with AI-driven analytics with an artificial intelligence (AI) driven analytics platform to bolster security and enhance accuracy. For example, biometric authentication program (110) can leverage one or more AI algorithms to process complex chemical signatures or bioelectric patterns, such as ECG data, with heightened precision and speed. This integration enables the system to perform real-time analysis, detecting subtle variations and patterns that may indicate fraudulent activity or unauthorized access attempts. Further, biometric authentication program (110) can further leverage the one or more AI algorithms for continuous learning. In this manner, biometric authentication program (110) can leverage one or more AI algorithms to continuously learn and adapt to new data to reduce false positives.

In certain embodiments, biometric authentication program (110) can be integrated with blockchain technology to enhance the security and integrity of data storage. By leveraging blockchain's decentralized and immutable ledger, biometric authentication program (110) can securely store biometric data in a manner that is resistant to tampering and unauthorized access. For example, biometric authentication program (110) can record each biometric transaction or authentication event can be recorded as a block in the blockchain, ensuring transparency and traceability. The distributed nature of blockchain ensures that no single point of failure exists, providing robust protection against data breaches. In some embodiments, biometric authentication program (110) can leverage smart contracts within the blockchain and can automate the authentication process, enabling seamless verification while maintaining user privacy and data confidentiality. This integration creates a secure and reliable system for managing sensitive biometric information. In other instances, biometric authentication program (110) can store one or more user profiles information on a private blockchain ledger for increased security.

Further, in certain instances, biometric authentication program (110) can be integrated with 5G and NextG technology to enable real-time processing. The high-speed and low-latency capabilities of NextG networks facilitate the rapid transmission and analysis of complex biometric data, such as chemical signatures or bioelectric patterns, allowing for instantaneous authentication.

In other embodiments, biometric authentication program (110) integrates with quantum computing for advanced encryption. For example, biometric authentication program (110) can leverage quantum encryption techniques, such as quantum key distribution (QKD) or quantum number generation, to provide robust protection against threats like eavesdropping or tampering, ensuring secure data transmission and storage.

Figure 2:
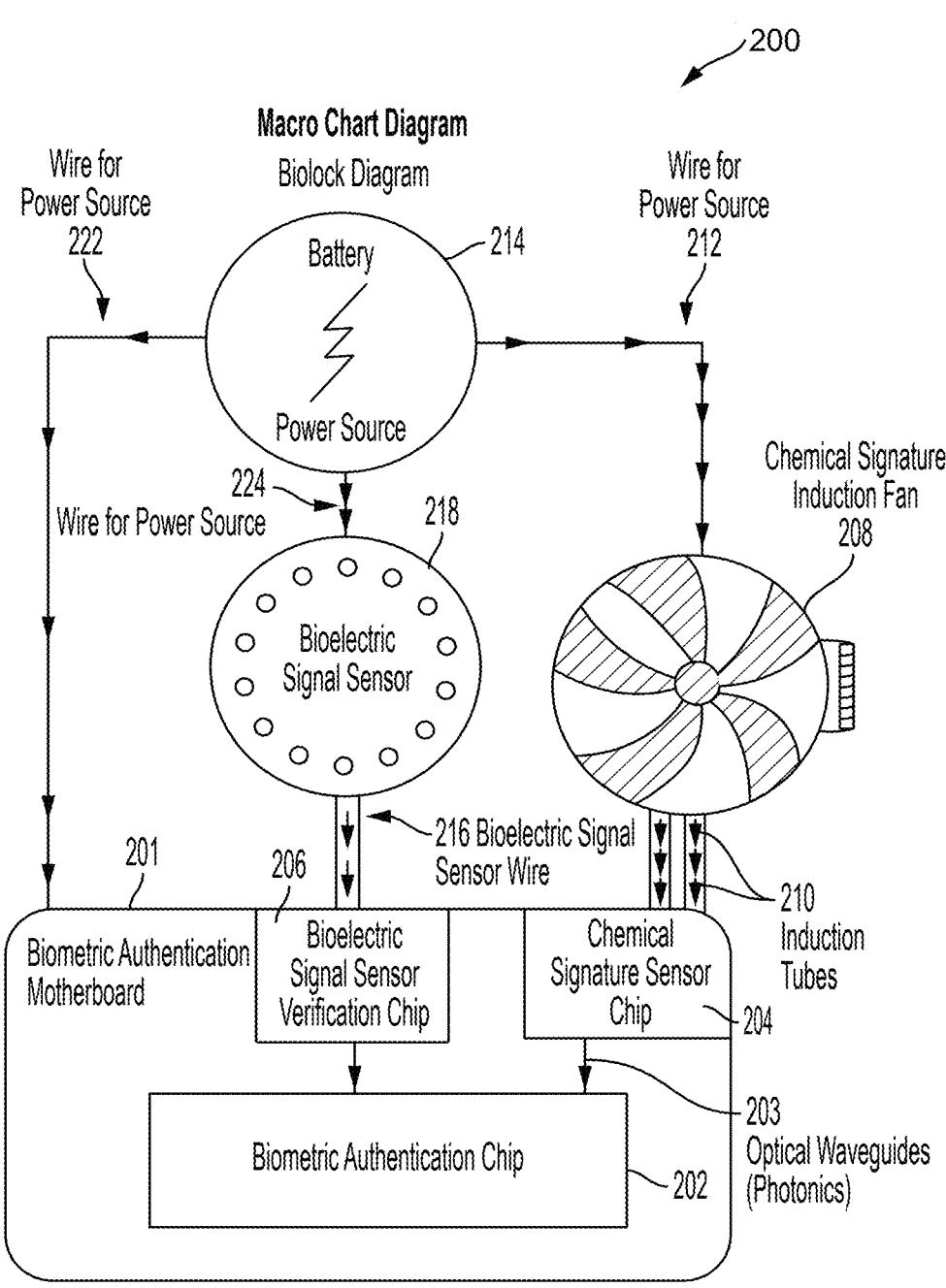
FIG. 2 is a functional block diagram illustrating components of biometric security application, in accordance with various embodiments of the systems and methods disclosed herein.

FIG. 2 is a functional block diagram illustrating components of biometric security application, in accordance with various embodiments of the systems and methods disclosed herein.

In this example, an alternate architecture of computing device (200) is shown and described. In this example, computing device (200) motherboard (201) powered by battery (214) via wire (222). Computing devices (200) includes local instances of biometric authentication program (110) (also referred to as biometric authentication system (202)).

Computing device (102), as depicted in FIG. 1 and detailed in FIG. 2, includes sensor modules, such as chemical sensor chip (204) and bioelectric sensor chip (206), for biometric data acquisition. The chemical sensor chip (204), powered by energy sources like battery (214) via connection mechanisms such as wire (212), interfaces with sample collection mechanisms, such as induction fan (208) via conduits like tubes (210), to direct biological samples (e.g., sweat, saliva, breath) to the sensor array. The bioelectric sensor chip (206), incorporating bioelectric signal sensor (218) positioned for optimal signal capture (e.g., via skin contact or non-contact methods), detects physiological signals (e.g., ECG, EEG, EMG). A processing unit, such as biometric authentication chip (202), receives data from these modules through communication interfaces, including but not limited to optical waveguides (203), high-speed buses (e.g., I2C, SPI), or wireless protocols, ensuring low-latency data transfer across electronic devices, including but not limited to smartphones, wearables, IoT systems, or access control platforms. In embodiments with photonic integration, optical components, such as waveguides (203) embedded in device structures, facilitate efficient data transmission. The chemical sensor chip (204) detects biomarkers, including but not limited to volatile organic compounds, metabolites, or electrolytes, while additional components, such as micro-sensor arrays or signal conditioning circuits, may enhance detection and processing, supporting robust biometric authentication by program (110).

Bioelectric signal sensor verification chip (206) is powered by battery (214) via wire (224) and communicates with bioelectric signal sensor (218) via bioelectric signal sensor wire (216). In this manner, biometric authentication program (110) can utilize bioelectric signal sensor verification chip (206) and bioelectric signal sensor (218) to capture electrical signals from the body, including: heart rhythms, brainwave patterns, nervous system, and muscles, and a human's unique electromagnetic energy field acquired by respective sensors. In this embodiment the sensors are calibrated to capture the unique signal frequencies and time-domain characteristics inherent to the user.

Computing device (102) further includes a processing unit (not shown) that analyzes received samples performs biometric analysis, and compares live sensor data against stored, user-specific biometric profiles established during an enrollment phase.

Computing device (102) further includes one or more adaptive algorithms (not shown) that account for natural signal variances and environmental factors to minimize false rejections or acceptances.

Computing device (102) further includes a time-limited activation module (not shown) that enforces an authentication window. Once a valid authentication is achieved, the system enables device functionality only for a time interval (e.g., a preset duration after which periodic re-authentication is necessary).

Computing device (102) can further include a device interlock mechanism that is configured to prevent device operation in response to detecting an unauthorized attempt to access the device. In this way, biometric authentication program (110) is intrinsically bound to a specific device through hardware and firmware integration and ensures that even if the device is physically compromised or stolen, unauthorized users cannot gain access or impersonate the owner. Put another way, when unauthorized biometrics are detected, or if the device is accessed outside the authorized time window, the lock mechanism prevents full device operation.

In this embodiment, biometric authentication program (110) can include a graphic user interface (not shown) configured to enable a user to select a particular mode. For example, a configuration interface (either via a dedicated app or integrated into the device firmware) empowers the user to select their preferred biometric mode (e.g., either chemical or bioelectric signal authentication) or to require dual-mode authentication, that is both chemical and bioelectric signal authentication. The interface also provides options to update biometric profiles and adjust time activation parameters.

Figure 3:
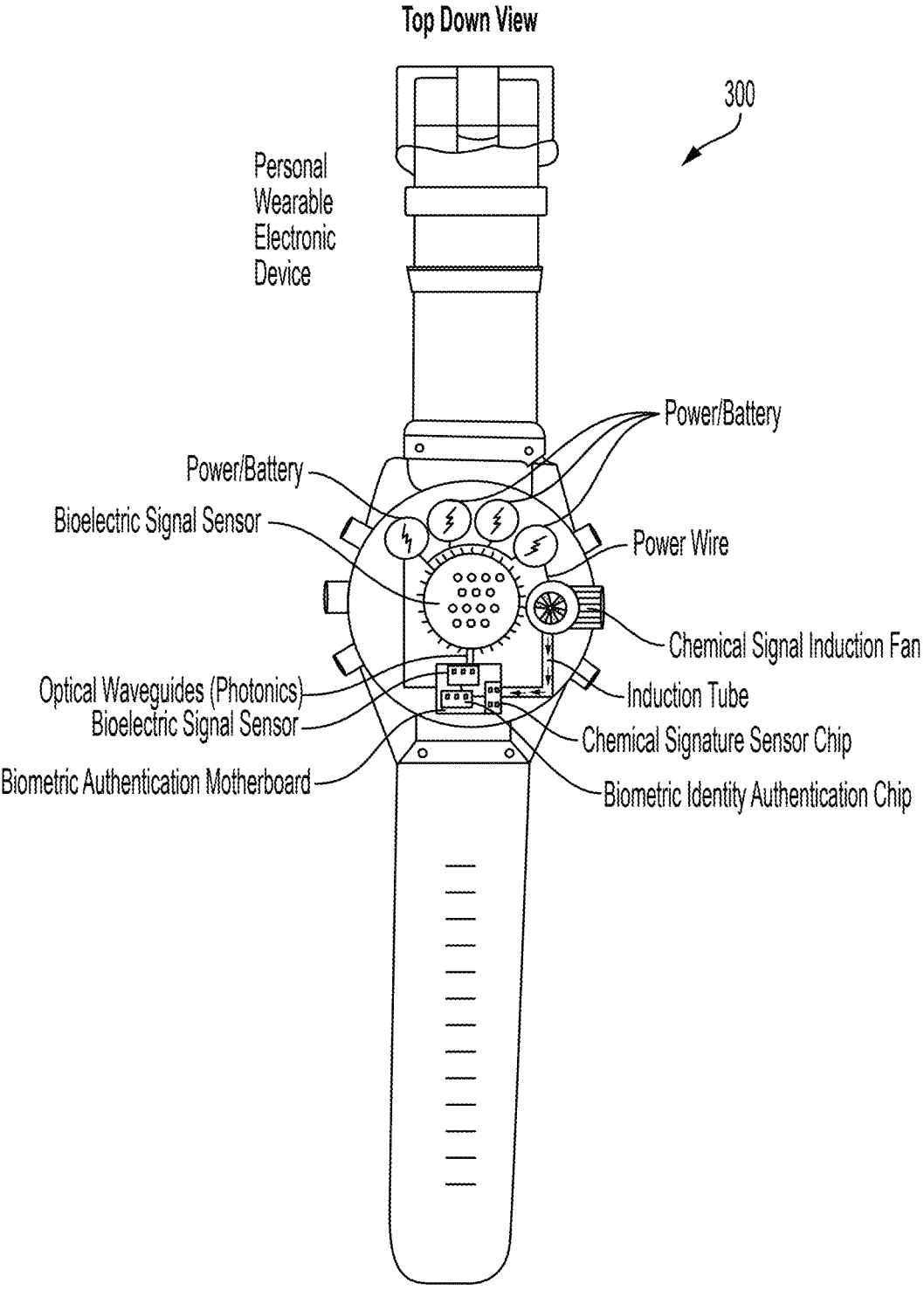
FIG. 3 is a top down view of a wearable device, in accordance with various embodiments of the systems and methods disclosed herein.

FIG. 3 is a top-down view of a wearable device, in accordance with various embodiments of the systems and methods disclosed herein.

In this example, computing environment (300) is illustrative of an alternate architecture of a computing device shown as a wearable device (e.g., a smart watch). Computing environment includes one or more battery sources. In this embodiment, battery sources can include lithium ion, lithium polymer and solid-state batteries. In other embodiments, other batteries or sources of power may be used.

The batteries (i.e., power sources) can be connected to one or more power wires connected to chemical signal induction fans and bioelectric signal sensors. The wearable device includes local instances of biometric authentication program (110) (also referred to as biometric authentication system).

The chemical signature sensor chip communicates with chemical signature induction fan via induction tubes to detect biomarkers such as sweat composition and pheromones.

Computing environment (300) further includes a bioelectric signal sensor verification chip that communicates with a bioelectric signal sensor to capture electrical signals from the body, including: heart rhythms, brainwave patterns, nervous system, and muscles, and a human's unique electromagnetic energy field acquired by respective sensors. In this embodiment the sensors are calibrated to capture the unique signal frequencies and time-domain characteristics inherent to the user. In this embodiment, the bioelectric signal sensor is operably connected to the biometric authentication motherboard via optical waveguides (photonics) that is embedded in the device casing.

Figure 4:
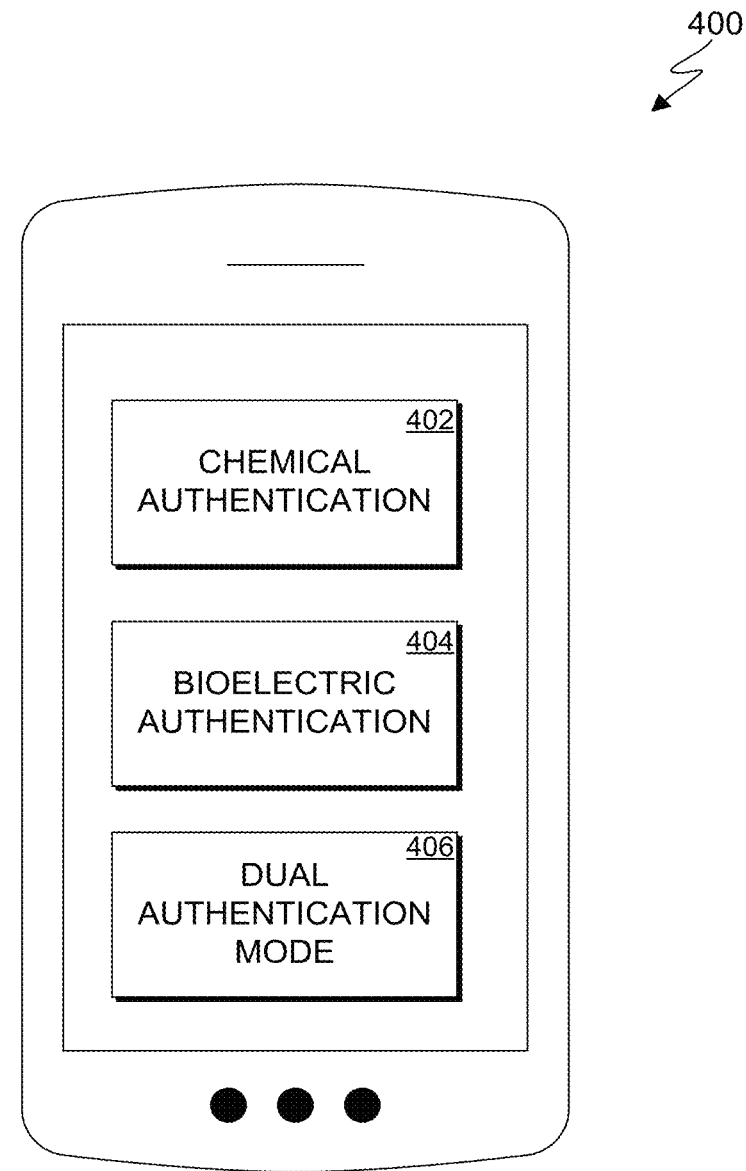
FIG. 4 is an example block diagram of a graphic user interface, in accordance with various embodiments of the systems and methods disclosed herein.

FIG. 4 is an example block diagram of a graphic user interface, in accordance with various embodiments of the systems and methods disclosed herein.

Example diagram (400) shows a graphic user interface shown on a mobile computing device (e.g., a smart phone). In this example, the graphic user interface shows three graphic display elements, which, when selected triggered an action. In this embodiment, the three display elements are rectangular in shape. In other embodiments, the three graphic display elements can be physical buttons on a computing device.

In this embodiment, the three display elements, when selected can configure authentication modes of biometric authentication program (110). In this example, graphic display element (402) represents a button that, when selected, configures bioelectric authentication program (110) to enable the chemical authentication mode. Graphic display element (404) represents a button that, when selected, configures bioelectric authentication program (110) to enable the bioelectric authentication mode. Graphic display element (404) represents a button that, when selected, configures bioelectric authentication program (110) to enable the dual authentication mode (406). In this embodiment, the dual authentication mode (406) comprises chemical authentication and bioelectric authentication.

Figure 5:
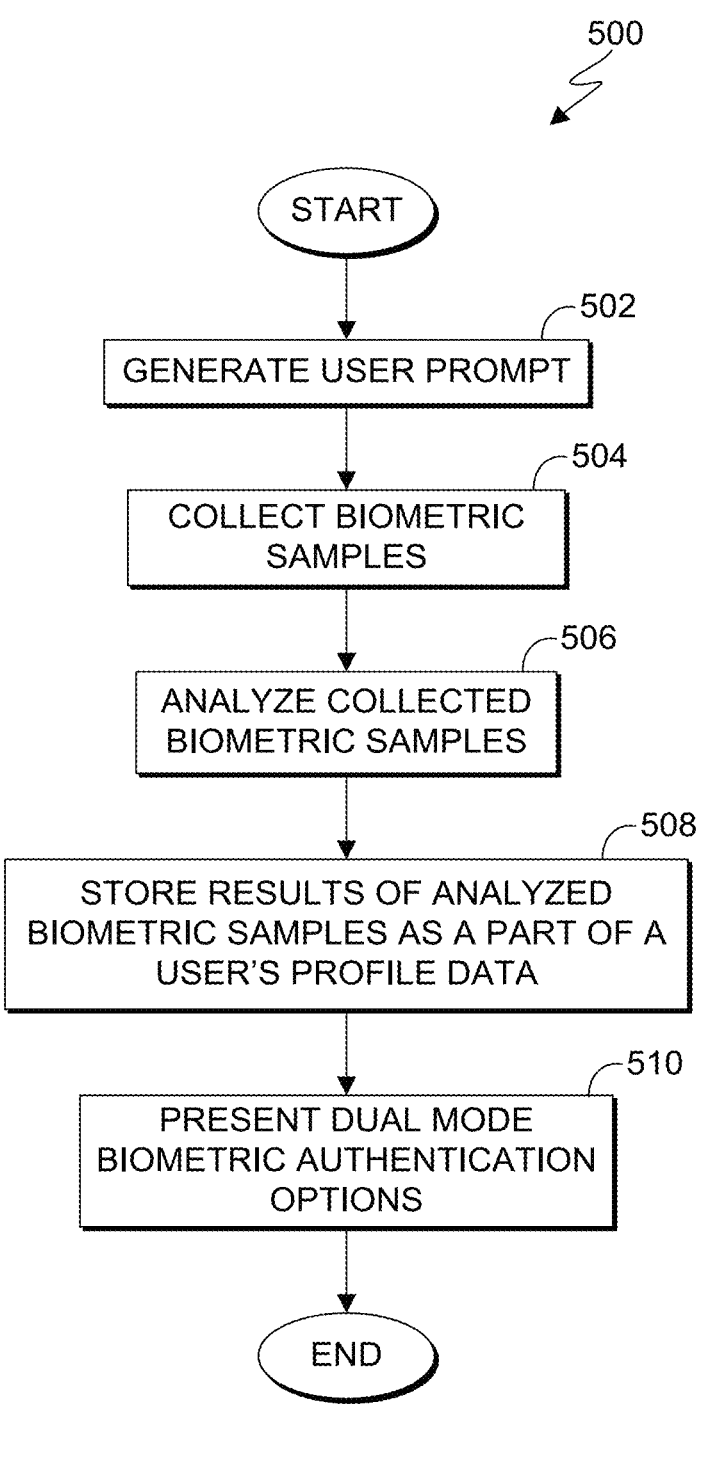
FIG. 5 is a flowchart depicting an example of operational steps for user enrollment, in accordance with various embodiments of the systems and methods disclosed herein.

FIG. 5 is a flowchart depicting an example of operation steps for user enrollment, in accordance with various embodiments of the systems and methods disclosed herein.

In step (502), biometric authentication program (110) generates a user prompt. In this embodiment, biometric authentication program (110) generates a user prompt to enroll in biometric authentication for a respective user device. In this embodiment, biometric authentication program (110) can generate a prompt for display on a portion of a graphic user interface of a computing device (e.g., computing device (110)). In this embodiment, the prompt can include a request for a user to enroll in biometric authentication. The prompt can further include one or more messages that provide a user with informed consent and allows a user to withdraw consent and remove collected user data (e.g., user profile information, collected biometric samples, analysis of collected biometric samples, etc.) via an opt-in/opt-out mechanism.

In step (504), biometric authentication program (110) collects biometric samples of a user. A biometric sample, as used herein, includes one or more of a user's bodily secretions and/or bioelectric signals. For example, biometric authentication program (110) can collect a user's sweat to perform chemical authentication. In other embodiments, other chemical biometrics samples that can be collected comprise a user's tears, saliva, DNA composition, and scent. A biometric sample can include the following bioelectric biometrics: electrocardiogram, electroencephalogram, electromyogram, galvanic skin response, electrooculogram to measure a user's unique electromagnetic energy field.

In step (506), biometric authentication program (110) analyzes the collected biometric samples. In this embodiment, biometric authentication program (110) can perform chemical signature authentication, bioelectric signature authentication, and/or both chemical and bioelectric signature authentication.

For example, in instances where biometric authentication program (110) receives a sample to be used for chemical authentication, biometric authentication program (110) analyzes the collected biometric sample to detect and identify specific biomarkers in the collected sample. As mentioned prior, biomarkers include amino acids, electrolytes, metabolites, and other organic compounds that are unique to the individual. In some embodiments, biometric authentication program (110) can leverage one or more electrochemical sensors and microfluidic devices to detect and quantify biomarker compounds. Biometric authentication program (110) can then utilize one or more algorithms to recognize patterns unique to the user's individual chemical signature. For example, in some embodiments, biometric authentication program (110) can employ one or more machine learning techniques to perform pattern recognition that considers potential variations in sweat composition due to factors such as diet, environment, and hydration levels.

In instances where biometric authentication program (110) receives a sample to be used for bioelectric authentication program receives a sample to be used for bioelectric authentication, biometric authentication program (110) analyzes the collected biometric sample to detect and identify specific biomarkers in the collected sample. In this embodiment, biometric authentication program (110) uses one or more signal processing techniques comprising filtering, normalization, and feature extraction to analyze the collected biometric sample. Biometric authentication program (110) can then use one or more machine learning algorithms, neural networks, and support vector machines to identify specific bioelectric markers that are unique to the user and integrate the one or more readings and patterns to uniquely generate a respective user's unique bioelectric signature. For example, biometric authentication program (110) can collect readings from electrocardiograms, electroencephalogram, electromyograms, electrooculogram, galvanic skin response, electrogastrogram, and electroretinograms, integrate these readings and patterns from the readings to generate a respective user's unique bioelectric signature.

In step (508), biometric authentication program (110) stores the result of analyzed biometric samples as a part of a user's profile data. In this embodiment, biometric authentication program (110) stores the result of analyzed biometric samples as a baseline for a user as a part of the user's profile. In this manner, biometric authentication program (110) can then receive subsequent biometric samples and use the baseline results for the user to authenticate a user providing the subsequent biometric sample as discussed in greater detail with respect to FIG. 6.

In step (510), biometric authentication program (110) presents dual mode biometric authentication options. In this embodiment, biometric authentication program (110) generates a graphic user interface having display elements on a portion of the graphic user interface that presents dual mode biometric authentication options as shown and described in FIG. 4. For example, biometric authentication program (110) can present a display element that represents a dual authentication mode which, when selected, configures a user device to be authenticated based on both chemical and bioelectric authentication. Biometric authentication program (110) can also present another display element that represents a chemical authentication mode, which, when selected, configures the user device to be authenticated based on chemical authentication. Finally, biometric authentication program can also present yet another display element that represents a bioelectric authentication mode, which, when selected, configures the user device to be authentication based on bioelectric authentication.

In this manner, by performing the operational steps of flowchart (500), biometric authentication program (110) can enroll one or more users into a biometric authentication system utilizing biometric authentication program (110) to authentication users based on chemical, bioelectric, and/or chemical and bioelectric signature authentication.

Figure 6:
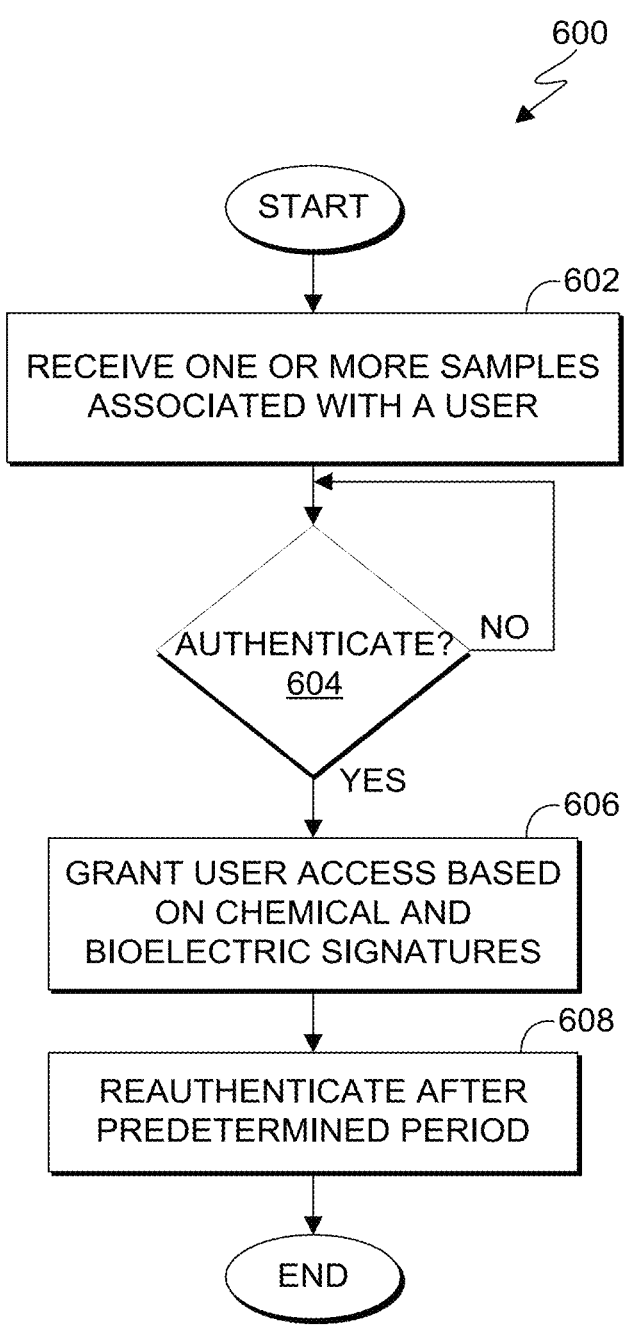
FIG. 6 is a flowchart depicting an example of operational steps for biometric authentication of users, in accordance with various embodiments of the systems and methods disclosed herein.

FIG. 6 is a flowchart (600) depicting an example of operational steps for biometric authentication of users, in accordance with various embodiments of the systems and methods disclosed herein.

In step (602), biometric authentication program (110) receives a set of one or more samples associated with a user. In this embodiment, the biometric authentication program (110) receives one or more samples associated with a user. For example, the biometric authentication program (110) can receive one or more samples associated with a user via one or more sensors (e.g., bioelectric signal sensor and chemical signature sensors). In other embodiments, biometric authentication program (110) can receive one or more samples from one or other components of computing environment (100). As mentioned prior, a sample includes one or more of a user's bodily secretions. For example, in this embodiment, biometric authentication program collects sweat samples.

In step (604), biometric authentication program (110) determines whether to authenticate a user. In this embodiment, biometric authentication program (110) determines whether to authenticate a user based on either a chemical signature or a bioelectric signature of the user. In other embodiments, biometric authentication program (110) determines whether to authenticate based both on the chemical and bioelectric signatures of the user. Put another way, biometric authentication program (110) provides a dual authentication mechanism to authenticate a user based on either the user's chemical signature, bioelectric signature or both the user's chemical and bioelectric signatures.

In this embodiment, biometric authentication program (110) determines whether to authenticate a user based on a chemical signature of the user by detecting the user's unique sweat composition and pheromones. In this embodiment, biometric authentication program (110) detects the user's unique sweat composition and pheromones by identifying specific biomarkers. As mentioned above, biomarkers refer to measurable indicators of a biological state or condition and include amino acids, electrolytes, metabolites, and other organic compounds that are unique to the individual. Biometric authentication program (110) utilizes one or more algorithms to recognize patterns unique to the user's individual chemical signature. For example, in some embodiments, biometric authentication program (110) can employ one or more machine learning techniques to perform pattern recognition that takes into account potential variations in sweat composition due to factors such as diet, environment, and hydration levels.

Biometric authentication program (110) can then compare stored profiles for the users (e.g., stored on database (112)) to authenticate a user. In response to matching a collected sample to a respective stored profile, biometric authentication program (110) authenticates the user. In some embodiments, biometric authentication program (110) can authenticate a user based on a threshold score indicating a match being reached. For example, in these embodiments, biometric authentication program (110) can be configured to authenticate a user based on a 90% threshold score that indicates a match. Biometric authentication program (110) can then store results of the compared sample and the analysis of the collected sample in database (112) for future reference.

In this embodiment, biometric authentication program (110) determines whether to authenticate a user based on bioelectric signature of the user by extracting relevant features from the bioelectric signals of the user use one or more signal processing techniques comprising filtering, normalization, and feature extraction. Biometric authentication program (110) can then use one or more machine learning algorithms, neural networks, and support vector machines to identify specific bioelectric markers that are unique to the user.

Biometric authentication program (110) can then compare stored profiles for the users (e.g., stored on database (112)) to authenticate a user as mentioned above.

If, in step (604), biometric authentication program does not authenticate a user, then, processing returns to step (602) to prompt a user to provide a sample and to subsequently receive one or more other samples associated with the user.

If, in step (604), biometric authentication program (110) authenticates a user, then, in step (606), biometric authentication program (110) grants user access based on chemical and/or bioelectric signatures. For example, biometric authentication program (110) can be configured to grant the user full access to the computing device. In some embodiments, biometric authentication program (110) may grant limited access subject to one or more security policies of the computing device.

In step (608), biometric authentication program (110) reauthenticates the user after a predetermined period of time. For example, in this embodiment, biometric authentication program (110) can be configured to reauthenticate after a thirty-minute period after the initial authentication. In other embodiments, biometric authentication program (110) can be configured to reauthenticate to any user-defined time. In certain embodiments, the period of time can be a repeatable time interval. For example, biometric authentication program (110) may be configured to reauthenticate every thirty minutes after the initial authentication. In this embodiment, biometric authentication program (110) reauthenticates the user after predetermined time by generating a prompt to the user to reauthenticate and provide another sample.

In certain embodiments, biometric authentication program (110) can disable functionalities of the computing device until a successful authentication. For example, biometric authentication program (110) can automatically trigger a lock screen after a predetermined period of time. In other embodiments, biometric authentication program (110) can disable network connectivity, preventing access to the internet or internal network resources until after the user reauthenticates. In yet other embodiments, biometric authentication program (110) can disable input mechanisms of the computing device. For example, biometric authentication program (110) can disable keyboard, mouse, touch, inputs rendering them unresponsive until the user interacts with the generated prompt to reauthenticate. In certain other embodiments, biometric authentication program (110) can dim or turn off the display entirely, except for the generated security prompt, which remains visible. In yet other embodiments, biometric authentication program (110) can generate a security alert notification overlaying other windows until a successful reauthentication to resume normal operations. In yet other embodiments, biometric authentication program (110) can restrict access to certain files or system resources until successful re-authentication. Accordingly, by performing the operational steps of flowchart (600), biometric authentication program (110) can provide a dual mode authentication mechanism to authenticate users based on their chemical, bioelectric, or both their chemical and bioelectric signatures. Biometric authentication program (110) represents a leap forward in biometric security by integrating dynamic authentication methods with time-sensitive access parameters. This approach not only addresses limitations in current biometric systems but also enhances personalized security.

Additional embodiments may explore deeper integration with wearable technology, computers, personal electronic devices, vehicles, facility and public transportation security systems, as well as applications in law enforcement and military personnel identification. These enhancements aim to support adaptive algorithms that improve through repeated user interactions. Integration with remote alert systems could also be included to respond to unauthorized access attempts. Furthermore, the development of multi-factor or hybrid authentication systems combining biometric data with traditional security methods may be considered to strengthen both personal device security and physical identity verification for security personnel.

Figure 7:
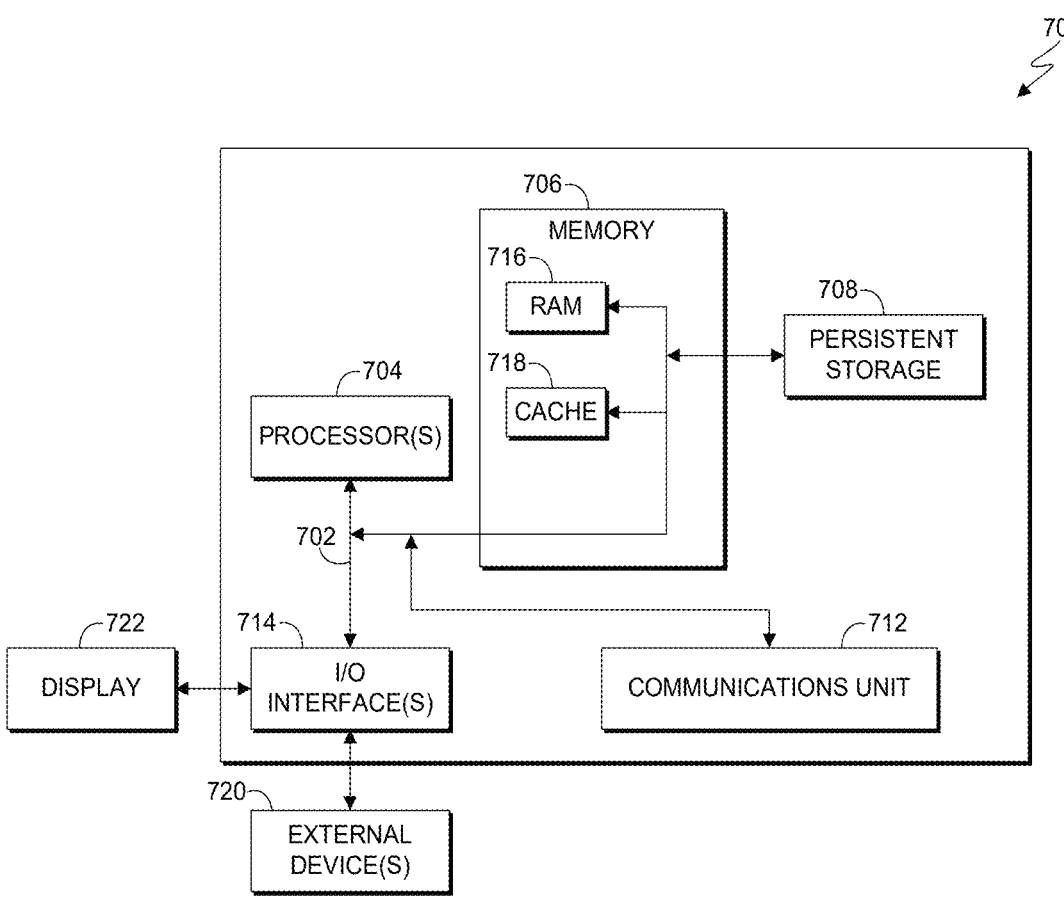
FIG. 7 depicts a block diagram of components of the computing systems of FIG. 1, in accordance with various embodiments of the systems and methods disclosed herein.

FIG. 7 depicts a block diagram of components of computing systems within computing environment (100) of FIG. 1, in accordance with an aspect of the systems and methods of the present disclosure. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment. However, it should be appreciated that any particular program nomenclature herein is used merely for convenience, and thus aspects of the systems and methods disclosed herein should not be limited to use solely in any specific application identified and/or implied by such nomenclature.

Computer system (700) includes communications fabric (702), which provides communications between cache (716), memory (706), persistent storage (708), communications unit (712), input/output (I/O) interface(s) (714), and the display (722). Communications fabric (702) can be implemented with any architecture designed for passing data and/or control information between processors (such as microprocessors, communications and network processors, etc.), system memory, peripheral devices, and any other hardware components within a system. For example, communications fabric (702) can be implemented with one or more buses or a crossbar switch.

Memory (706) and persistent storage (708) are computer readable storage media. In this embodiment, memory (706) includes random access memory (RAM). In general, memory (706) can include any suitable volatile or non-volatile computer readable storage media. Cache (716) is a fast memory that enhances the performance of computer processor(s) (704) by holding recently accessed data, and data near accessed data, from memory (706).

Biometric authentication program (110) (not shown) may be stored in persistent storage (708) and in memory (706) for execution by one or more of the respective computer processors (704) via cache (716). In an embodiment, persistent storage (708) includes a magnetic hard disk drive. Alternatively, or in addition to a magnetic hard disk drive, persistent storage (708) can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage (708) may also be removable. For example, a removable hard drive may be used for persistent storage (708). Other examples include optical and magnetic disks, thumb drives, and smart cards that are inserted into a drive for transfer onto another computer readable storage medium that is also part of persistent storage (708).

Communications unit (712), in these examples, provides for communications with other data processing systems or devices. In these examples, communications unit (712) includes one or more network interface cards. Communications unit (712) may provide communications through the use of either or both physical and wireless communications links. Biometric authentication program (110) may be downloaded to persistent storage (708) through communications unit (712).

I/O interface(s) (712) allows for input and output of data with other devices that may be connected to computing device (102) and server computer (108). For example, I/O interface (712) may provide a connection to external devices (718) such as a keyboard, keypad, a touch screen, and/or some other suitable input device. External devices (718) can also include portable computer readable storage media such as, for example, thumb drives, portable optical or magnetic disks, and memory cards. Software and data used to practice aspects of the present disclosure can be stored on such portable computer readable storage media and can be loaded onto persistent storage (708) via I/O interface(s) (712). I/O interface(s) (712) also connect to a display (720).

Display (720) provides a mechanism to display data to a user and maybe, for example, a computer monitor.

Aspects of the various systems and methods may be a system, a method, and/or a computer program product (CPP). Various aspects of the disclosure are described by narrative text, flowcharts, block diagrams of computer systems and/or block diagrams of the machine logic included in computer program product embodiments. With respect to any flowcharts, depending upon the technology involved, the operations can be performed in a different order than what is shown in each flowchart. For example, again depending upon the technology involved, two operations shown in successive flowchart blocks may be performed in reverse order, as a single integrated step, concurrently, or in a manner that at least partially overlapping in time.

A computer program product (CPP) embodiment, as used herein, refers to one or more non-transitory storage media within storage devices containing machine-readable instructions for performing computer operations specified in a CPP claim. Storage devices include, but are not limited to, electronic, magnetic, optical, electromagnetic, semiconductor, or mechanical media, such as solid-state drives, hard disks, random access memory (RAM), read-only memory (ROM), flash memory, compact discs (CD-ROM), digital versatile disks (DVD), or combinations thereof. The term "non-transitory storage medium" excludes transitory signals, such as radio waves, electromagnetic waves through waveguides, light pulses in fiber optic cables, or electrical signals in wires. Data movement during normal storage operations, such as access, defragmentation, or garbage collection, does not render the medium transitory, as the data remains stored, as depicted in computing systems like those in FIG. 7.

Aspects of the systems and methods of the present disclosure are described herein with reference to flowchart illustrations and/or block diagrams of methods, apparatus (systems), and computer program products according to aspects of the various systems and methods disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the systems and methods of the present disclosure. In this regard, each block in the flowchart or block diagrams may represent a module, a segment, or a portion of instructions, which comprise one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the systems and methods of the present disclosure have been presented for purposes of illustration but are not intended to be exhaustive or limited to the embodiments disclosed. Many modifications and variations will be apparent to those of ordinary skill in the art without departing from the scope and spirit of aspects of the present disclosure. The terminology used herein was chosen to best explain the principles of the embodiment, the practical application or technical improvement over technologies found in the marketplace, or to enable others of ordinary skill in the art to understand the embodiments disclosed herein.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

CONCLUSION

In conclusion, the biometric authentication system and method of the present invention represent a significant advancement in secure user verification, integrating at least two dynamic biometric modalities—such as chemical signatures from biological samples and bioelectric signatures forming a unique electromagnetic energy field—with cutting-edge technologies like nanostructured sensor arrays, photonic interconnects, and machine learning-driven adaptive scoring models. By offering user-configurable protocols, time-limited activation, and compatibility with next-generation networks, the invention ensures robust, adaptable, and future-proof authentication across diverse applications, including personal devices, secure facilities, autonomous vehicles, and IoT ecosystems. This innovative approach delivers superior accuracy, environmental resilience, and protection against unauthorized access, positioning the system as a versatile, scalable solution that redefines the standards of biometric security for current and emerging technological landscapes.

What is claimed is:

1. A method for authenticating a user, comprising:
   receiving, by one or more processors, one or more samples associated with the user, the samples comprising at least two dynamic biometric modalities;
   processing, by the one or more processors, the samples using an adaptive scoring model to generate a biometric signature, the adaptive scoring model integrating data from the at least two dynamic biometric modalities;
   authenticating, by the one or more processors, the user by comparing the biometric signature to a stored profile;
   in response to a successful authentication, granting, by the one or more processors, access to a system or device; and
   re-authenticating, by the one or more processors, the user after a configurable time interval to maintain access;
   wherein processing the samples comprises using one or more nanostructured sensor arrays to detect biomarkers in the samples, the nanostructured sensor arrays comprising materials selected from the group of graphene, carbon nanotubes, or polymer composites;

further comprising directing the one or more samples to the nanostructured sensor arrays using a micro-electro-mechanical system (MEMS)-based airflow mechanism.

2. The method of claim 1, wherein the at least two dynamic biometric modalities include a chemical signature derived from one or more biological samples and a bioelectric signature comprising a unique electromagnetic energy field derived from one or more physiological signals.

3. The method of claim 2, wherein the one or more biological samples comprise at least one of sweat, saliva, breath, or tears, and the chemical signature includes volatile organic compounds (VOCs) such as lactic acid, urea, or pheromones.

4. The method of claim 2, wherein the one or more physiological signals comprise at least one of electroencephalogram (EEG) signals at 0.5-40 Hz, electrocardiogram (ECG) signals at 0.5-40 Hz, electromyogram (EMG) signals at 20-150 Hz, galvanic skin response, or electroretinogram signals.

5. The method of claim 1, wherein processing the samples comprises transmitting data via one or more high-speed communication interfaces to achieve data rates of at least 500 Gbps with latency below 2 microseconds.

6. The method of claim 1, wherein the adaptive scoring model comprises a weighted fusion algorithm that assigns weights to data from the at least two dynamic biometric modalities based on signal reliability or application requirements, and the successful authentication requires a combined score exceeding a configurable threshold.

7. The method of claim 1, further comprising dynamically calibrating one or more sensors based on environmental conditions, the environmental conditions including temperature ranging from −20° C. to 60° C. or humidity ranging from 10% to 95%.

8. The method of claim 1, wherein the system or device comprises at least one of a personal electronic device, a secure facility access system, a public transportation system, an autonomous vehicle, a medical device, or an Internet of Things (IoT) platform.

9. The method of claim 1, further comprising enabling user-configurable authentication protocols, the protocols allowing selection of one or more of the at least two dynamic biometric modalities for authentication.

10. The method of claim 1, further comprising detecting anomalies in the one or more samples using an artificial intelligence (AI)-driven model to identify potential spoofing attempts.

11. A biometric authentication system, comprising:

one or more sensors configured to collect one or more samples associated with a user, the samples comprising at least two dynamic biometric modalities;

one or more processors;

and one or more non-transitory computer-readable storage media storing instructions that, when executed by the one or more processors, cause the biometric authentication system to:

process the samples using an adaptive scoring model to generate a biometric signature, the adaptive scoring model integrating data from the at least two dynamic biometric modalities;

authenticate the user by comparing the biometric signature to a stored profile;

in response to a successful authentication, grant access to a system or device;

and re-authenticate the user after a configurable time interval to maintain access;

wherein processing the samples comprises using one or more nanostructured sensor arrays to detect biomarkers in the samples, the nanostructured sensor arrays comprising materials selected from the group of graphene, carbon nanotubes, or polymer composites;

further comprising directing the one or more samples to the nanostructured sensor arrays using a micro-electro-mechanical system (MEMS)-based airflow mechanism.

12. The system of claim 11, wherein the at least two dynamic biometric modalities include a chemical signature derived from one or more biological samples and a bioelectric signature comprising a unique electromagnetic energy field derived from one or more physiological signals.

13. The system of claim 11, further comprising one or more high-speed communication interfaces configured to transmit data from the one or more sensors to achieve data rates of at least 500 Gbps with latency below 2 microseconds.

14. The system of claim 11, wherein the adaptive scoring model comprises a weighted fusion algorithm that assigns weights to data from the at least two dynamic biometric modalities, and authentication requires a combined score exceeding a configurable threshold.

15. The system of claim 11, wherein the one or more sensors are dynamically calibrated based on environmental conditions, the environmental conditions including temperature ranging from −20° C. to 60° C. or humidity ranging from 10% to 95%.

16. The system of claim 11, wherein the instructions further cause the system to enable user-configurable authentication protocols, the protocols allowing selection of one or more of the at least two dynamic biometric modalities for authentication.

17. The system of claim 11, wherein the system is integrated into at least one of a personal electronic device, a secure facility access system, a public transportation system, an autonomous vehicle, a medical device, or an Internet of Things (IoT) platform.

18. The system of claim 11, further comprising a next-generation network interface configured to enable real-time processing of biometric data with latency below 5 milliseconds.

19. A non-transitory computer-readable storage medium storing instructions that, when executed by one or more processors, cause the one or more processors to:

receive one or more samples associated with a user, the samples comprising at least two dynamic biometric modalities;

process the samples using an adaptive scoring model to generate a biometric signature, the adaptive scoring model integrating data from the at least two dynamic biometric modalities;

authenticate the user by comparing the biometric signature to a stored profile;

in response to a successful authentication, grant access to a system or device; and re-authenticate the user after a configurable time interval to maintain access;

wherein processing the samples comprises using one or more nanostructured sensor arrays to detect biomarkers in the samples, the nanostructured sensor arrays comprising materials selected from the group of graphene, carbon nanotubes, or polymer composites;

further comprising directing the one or more samples to the nanostructured sensor arrays using a micro-electro-mechanical system (MEMS)-based airflow mechanism.

20. The non-transitory computer-readable storage medium of claim 19, wherein the at least two dynamic biometric modalities include a chemical signature derived from one or more biological samples and a bioelectric signature comprising a unique electromagnetic energy field derived from one or more physiological signals.

21. The non-transitory computer-readable storage medium of claim 19, wherein the instructions further cause the one or more processors to process the samples using one or more high-speed communication interfaces to achieve data rates of at least 500 Gbps.

22. The non-transitory computer-readable storage medium of claim 19, wherein the instructions further cause the one or more processors to enable user-configurable authentication protocols, the protocols allowing selection of one or more of the at least two dynamic biometric modalities for authentication.

23. The method of claim 5, wherein the one or more high-speed communication interfaces comprise intercon-nects selected from the group consisting of:

a. photonic interconnects utilizing optical waveguides to achieve data rates of at least 500 Gbps with latency below 2 microseconds;

b. electrical interconnects utilizing conductive wires to achieve data rates of at least 500 Gbps; and c. wireless interconnects utilizing radio frequency signals to achieve data rates of at least 500 Gbps.

24. The system of claim 13, wherein the one or more high-speed communication interfaces comprise intercon-nects selected from the group consisting of:

a. photonic interconnects utilizing optical waveguides to achieve data rates of at least 500 Gbps with latency below 2 microseconds;

b. electrical interconnects utilizing conductive wires to achieve data rates of at least 500 Gbps; and c. wireless interconnects utilizing radio frequency signals to achieve data rates of at least 500 Gbps.

25. The non-transitory computer-readable storage medium of claim 21, wherein the one or more high-speed communication interfaces comprise interconnects selected from the group consisting of:

a. photonic interconnects utilizing optical waveguides to achieve data rates of at least 500 Gbps;

b. electrical interconnects utilizing conductive wires to achieve data rates of at least 500 Gbps; and c. wireless interconnects utilizing radio frequency signals to achieve data rates of at least 500 Gbps.

* * * * *